United States Patent [19]

Mann

[11] Patent Number: 5,782,514
[45] Date of Patent: Jul. 21, 1998

[54] PIVOTING TAIL LIGHT BAR SYSTEM FOR MOVABLE-DECK VEHICLE

[76] Inventor: Fred W. Mann, Box 444, Waterville, Kans. 66548

[21] Appl. No.: 672,320

[22] Filed: Jun. 28, 1996

[51] Int. Cl.[6] ............................................. B60R 19/38
[52] U.S. Cl. ................................... 293/118; 414/480
[58] Field of Search ........................ 293/103, 116, 293/117, 118, 131, 132, 134; 414/478, 480, 482, 537

[56] References Cited

U.S. PATENT DOCUMENTS

| | | | |
|---|---|---|---|
| 2,288,246 | 6/1942 | Kuester | 280/677 |
| 2,487,325 | 11/1949 | Foster | 414/484 |
| 2,717,707 | 9/1955 | Martin | 414/483 |
| 2,789,714 | 4/1957 | Norris | 414/475 |
| 3,071,267 | 1/1963 | Bunch | 414/483 |
| 3,159,294 | 12/1964 | Forsythe, Jr. | 414/478 |
| 3,214,047 | 10/1965 | Moye . | |
| 3,241,855 | 3/1966 | Kersey et al. | 280/679 |
| 3,335,887 | 8/1967 | Snook | 414/476 |
| 3,472,406 | 10/1969 | Slipp | 414/475 |
| 3,550,801 | 12/1970 | Larson et al. . | |
| 3,606,059 | 9/1971 | Haberle, Jr. | 414/478 |
| 3,927,775 | 12/1975 | Graupmann . | |
| 4,133,440 | 1/1979 | Heidrick, Jr. | 414/483 |
| 4,243,353 | 1/1981 | Reed | 414/439 |
| 4,305,694 | 12/1981 | Chan | 293/118 |
| 4,318,657 | 3/1982 | Znidaric | 414/478 |
| 4,842,470 | 6/1989 | Hubbard | 414/478 |
| 4,986,719 | 1/1991 | Galbreath | 414/478 |
| 4,988,258 | 1/1991 | Lutz et al. | 293/118 |
| 5,011,362 | 4/1991 | Pijanowski | 414/480 |
| 5,022,703 | 6/1991 | Westbrook | 414/480 |
| 5,092,623 | 3/1992 | Swanner | 280/638 |
| 5,137,414 | 8/1992 | Sloan et al. | 414/477 |
| 5,263,807 | 11/1993 | Pijanowski | 414/480 |
| 5,324,160 | 6/1994 | Smith | 414/475 |

*Primary Examiner*—Jesus D. Sotelo
*Attorney, Agent, or Firm*—Litman, McMahon & Brown, L.L.C.

[57] ABSTRACT

A pivoting tail light bar system is attached beneath the rear of the deck of a movable-deck trailer and includes a tail light bar which pivots upwards as it contacts the ground during tilting of the trailer deck. The tail light bar automatically returns from its upper position to a normal trailering position as the deck is returned from the tilted to a horizontal transport position. The pivoting tail light bar is attached to a pair of shock absorbing support arms which absorb impacts directed at the tail light bar from the rear of the trailer. In an alternative embodiment, tail lights are conventionally placed on the rear of the trailer deck and a pivoting bumper system is provided which pivots upwards to cover and protect the lights when the deck is placed in the tilted position.

9 Claims, 4 Drawing Sheets

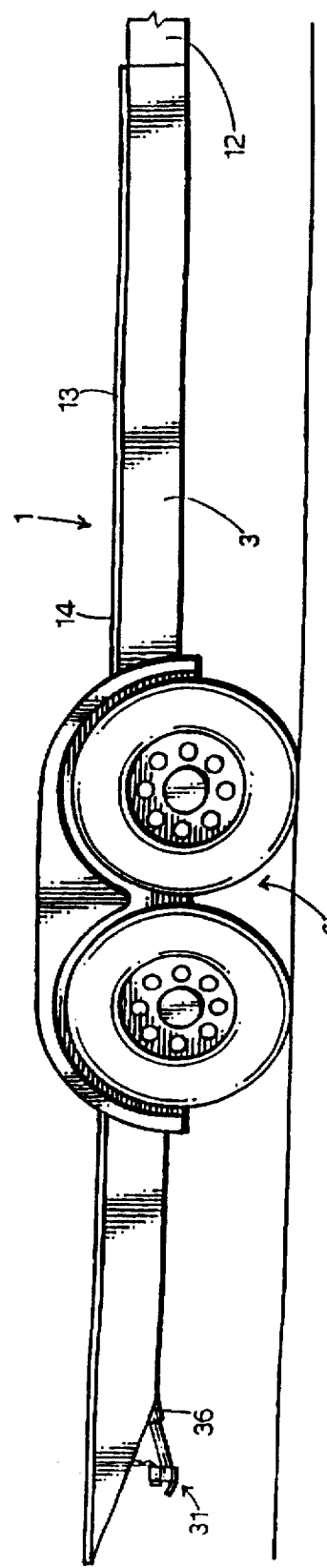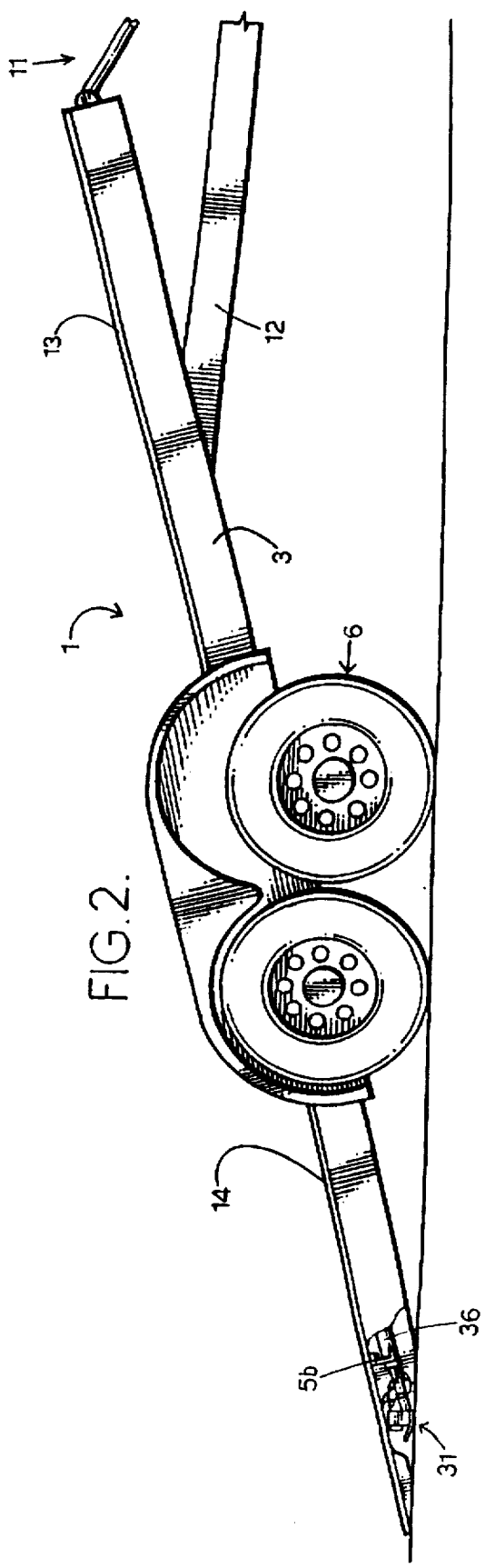

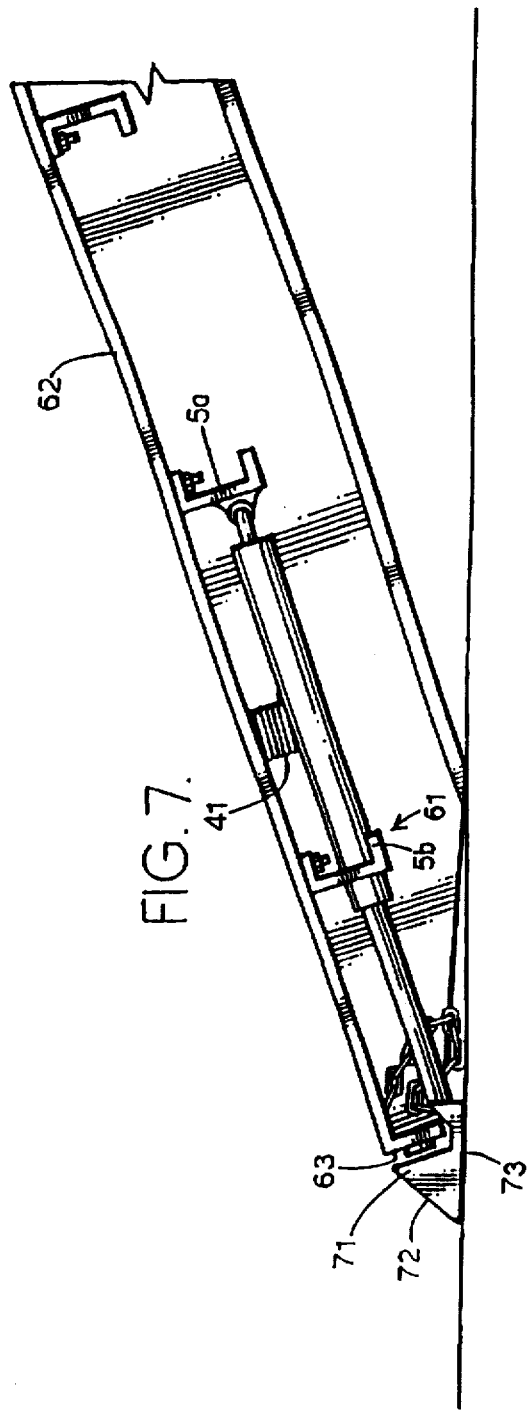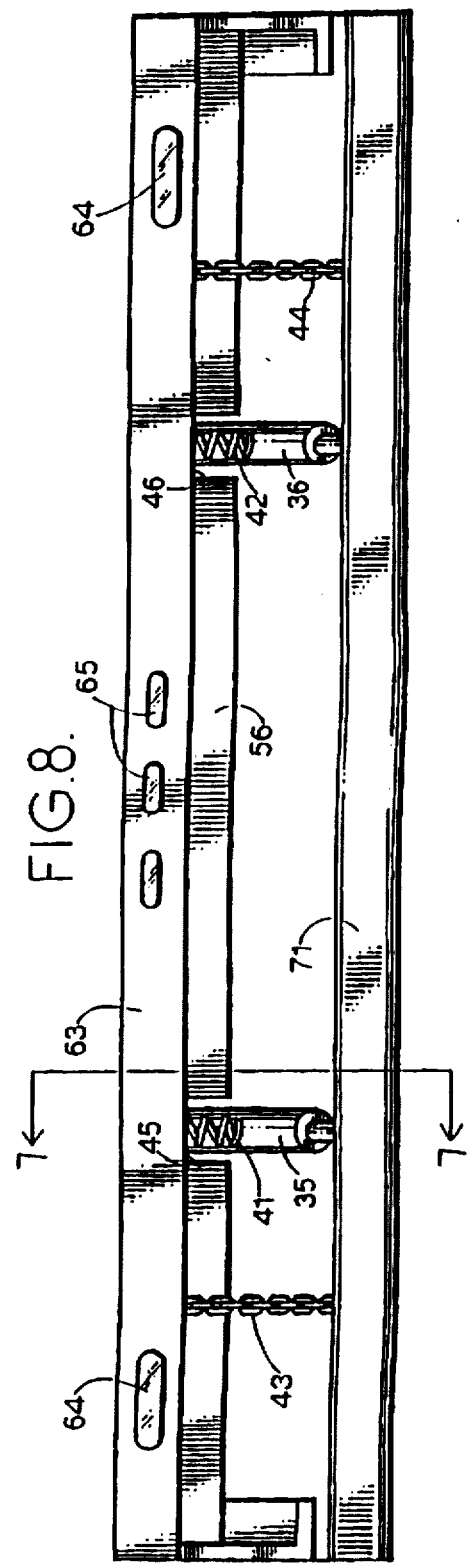

PIVOTING TAIL LIGHT BAR SYSTEM FOR MOVABLE-DECK VEHICLE

BACKGROUND OF THE INVENTION

1. Field of the Invention

The present invention relates generally to vehicles, and, in particular, to trailers with movable-decks or beds which facilitate loading and unloading of vehicles and other cargo items. The inventive movable-deck trailer includes a pivoting tail light bar system which adjusts the position of a tail light bar to accommodate for tilting of the trailer, and which includes shock absorbing supports for the tail light bar.

2. Description of the Related Art

A wide variety of vehicles have heretofore been devised for meeting the requirements of particular load-carrying applications. For cargo-carrying applications, vehicles are commonly provided with decks or beds for supporting the cargo in transit. However, cargo-carrying vehicle beds are often located at inconvenient heights for loading the cargo thereon. For example, in a transport configuration, vehicle cargo beds are located a certain distance above a road surface and are generally oriented horizontally flat. However, the transport positions of vehicle cargo beds are often inconvenient for loading purposes. For example, the transport position heights of vehicle beds are often approximately level with the heights of loading docks and similar structures.

Vehicles are frequently transported on the beds of other vehicles. However, vehicles generally require lifting from the elevation of a paved surface to the elevation of the transport vehicle bed in order to provide for transportation of same. In spite of the loading and unloading problems which must be dealt with logistically, transportation of cargo vehicles on the beds of other vehicles, for a variety of reasons, is often preferred over conventional tow trucks and other transport methods, even for relatively short travel distances.

In order to fulfill this demand, trucks and trailers are available which include integral flatbeds which can be tilted to form a ramp whereby vehicles being transported can be either driven or winched onto the sloping bed from a ground surface, whereafter the bed can be rotated to a generally horizontal travel configuration.

Examples of tilt-bed trailers include those shown in the Foster U.S. Pat. No. 2,487,325 and the Martin U.S. Pat. No. 2,717,707.

An example of a less costly, improved tilt-bed vehicle is described in application for U.S. patent Ser. No. 08/514,691, (the '691 application) filed by the present inventor on Aug. 14, 1995, and entitled Movable-deck TRAILER, which application is hereby incorporated by reference.

A problem often arises in such tilt-bed vehicles due to the tail lights being fixed in position relative to the tilting bed wherein tilting of the bed can result in damage to the tail lights. The present invention addresses this, as well as other problems associated with tilt-bed vehicle designs.

SUMMARY OF THE INVENTION

A movable-deck trailer is provided which includes a frame, a tongue assembly mounted on a front end of the frame and a deck mounted on top of the frame. A wheeled carriage is movably mounted on the frame and the frame and deck are adapted for pivotable movement with respect thereto whereby the frame and deck can be tilted between a generally horizontal transport configuration and a sloping or tilted loading/unloading position. The trailer includes a pivoting tail light bar system positioned beneath the rear of the deck including a tail light bar which is designed to pivot upwards as it contacts the ground during tilting of the trailer deck. The tail light bar is attached to a pair of support arms which are themselves pivotably attached beneath the trailer deck. The tail light bar is thus automatically moved between an upper position and a lower, transport position as the trailer deck is moved between the tilted loading/unloading position and the transport position, respectively. A further feature of the pivoting tail light bar system is that the support arms are shock absorbing which allows the tail light bar to absorb impacts directed at it from the rear of the trailer.

An alternative embodiment of the tail light bar system includes a pivoting, shock absorbing bumper which is also moved between an upper position and a lower, transport position as the trailer deck is moved between the tilted loading/unloading position and the transport position, respectively. The trailer deck is squared off at the rear and the tail lights and rear running lights are positioned in the deck. The pivoting bumper thus covers the lights when the deck is tilted to protect them from damage due to loading/unloading operations or inadvertent contact with loading docks, other vehicles, etc.

OBJECTS AND ADVANTAGES OF THE INVENTION

The principle objects and advantages of the present invention include: providing an improved movable-deck trailer with a deck which is movable between a substantially horizontal, transport position and a tilted, loading/unloading position; providing such a trailer which includes a pivoting tail light bar system; providing such a trailer in which the tail light bar system includes a tail light bar which is designed to pivot between an upper position and a lower, transport position as the trailer deck is moved between the tilted loading/unloading position and the transport position, respectively; providing such a trailer in which the tail light bar is constrained such that it drops only to a normal trailering position as the deck is restored to a transport position; providing such a trailer tail light bar with shock absorbing support arms to allow the tail light bar to absorb impacts directed at the bar from the rear of the trailer; and providing such a trailer and tail light bar system which is economical to manufacture, efficient in operation, capable of a long operating life and which is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a side elevational view of the movable-deck trailer with pivoting tail light bar system of FIG. 1, and illustrating the trailer deck in a tilted position and with portions of the trailer deck and frame broken away to illustrate the tail light bar in a raised position.

FIG. 4 is a side elevational view of the movable-deck trailer with pivoting light bar of FIG. 1, and illustrating the trailer deck in a transport position and the tail light bar in a lowered position.

FIG. 7 is a greatly enlarged, fragmentary, cross sectional view of the trailer of FIG. 1, taken along line 7—7 of FIG. 8, and showing a portion of the trailer deck in the transport position and the tail light bar in a lowered position.

FIG. 8 is an enlarged, fragmentary, rear elevational view of an alternative embodiment of pivoting bumper, showing the trailer deck in the transport position and the bumper in the lowered position.

DETAILED DESCRIPTION OF THE PREFERRED EMBODIMENTS

I. Introduction and Environment

Figure 1:
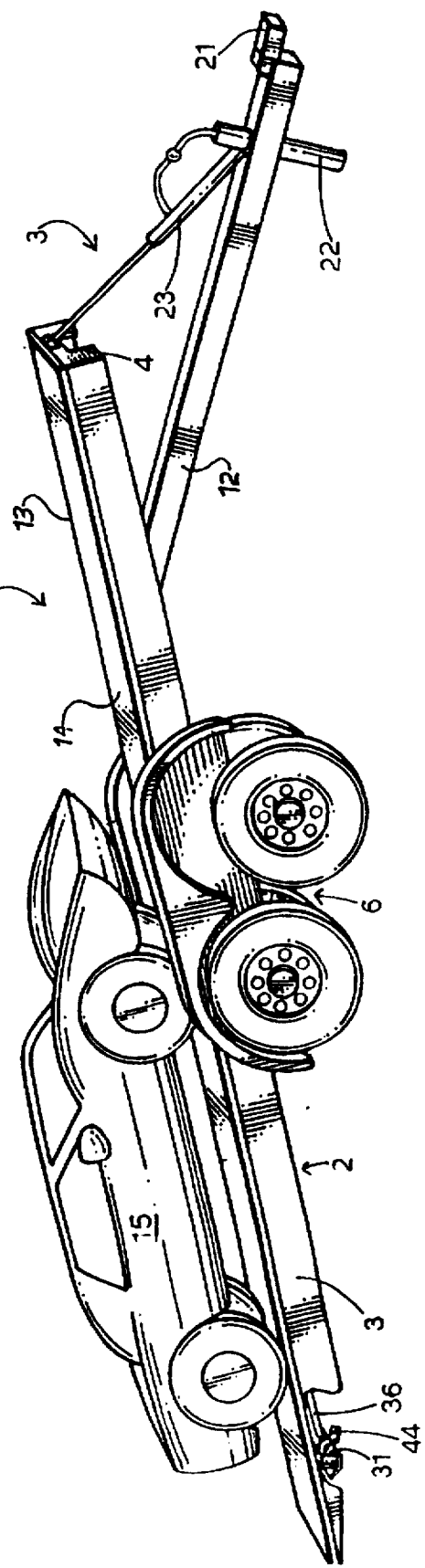
FIG. 1 is a perspective view of a movable-deck trailer with pivoting tail light bar system embodying the present invention, and illustrating the trailer deck in a tilted position and with portions of the trailer deck and frame broken away to illustrate the tail light bar in a raised position.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "up", "down", "right" and "left" will refer to directions in the drawings to which reference is made. Said terminology will include the words specifically mentioned, derivatives thereof and words of a similar import.

Referring to the drawings in more detail, reference numeral 1 generally designates a movable bed trailer embodying the present invention. The trailer 1 generally comprises a frame 2 including a pair of side frame members 3, a front frame member 4, and a plurality of supporting beams 5 extending between the side frame members 2. The frame 2 is attached to and is pivotable about a wheeled carriage 6. A tongue assembly 11 includes a tongue 12 with a rear end pivotably attached to the frame 2 beneath a trailer deck 13. The deck 13 is supported by the frame 2 and includes a generally rectangular support surface 14 for transporting a load, such as the automobile 15. A front end of the tongue 12 terminates in a hitching ball socket 21 adapted for connection to a towing vehicle (not shown). The tongue assembly 3 includes a support stand 22 and a hydraulic piston and cylinder jack unit 23 pivotably attached at one end to the support stand 22 and at the opposite end to the front frame member 4.

Figure 3:
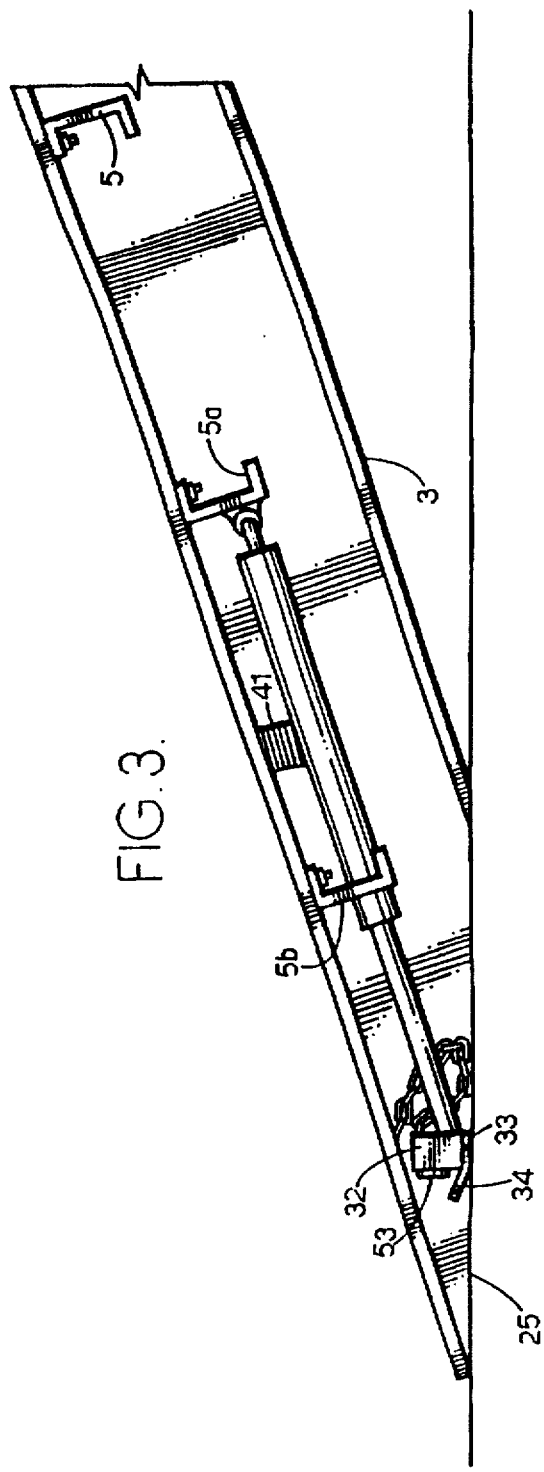
FIG. 3 is a greatly enlarged, fragmentary, cross-sectional view of the trailer of FIG. 1, taken along line 5—5 of FIG. 6, and showing a portion of the trailer deck and frame in the tilted position and the tail light bar in a raised position.

Referring to FIG. 4, the trailer 1 is shown in a transport position with the piston and cylinder jack 23 retracted and the deck 13 oriented in a generally horizontal position. When a load, such as the automobile 15, needs to be loaded or unloaded, the jack 23 is extended, thus causing the frame 2 and the attached deck 13 to pivot about the carriage 6 such that the front is raised and the rear is lowered to ground level. The rearmost portion of the deck 13 and the side frame members 3 have a rear surface 24 beveled at an angle 25 which allows them to lie flat on the ground when the jack 23 is fully extended, as shown in FIGS. 1–3.

II. Pivoting Tail Light Bar System

Figure 5:
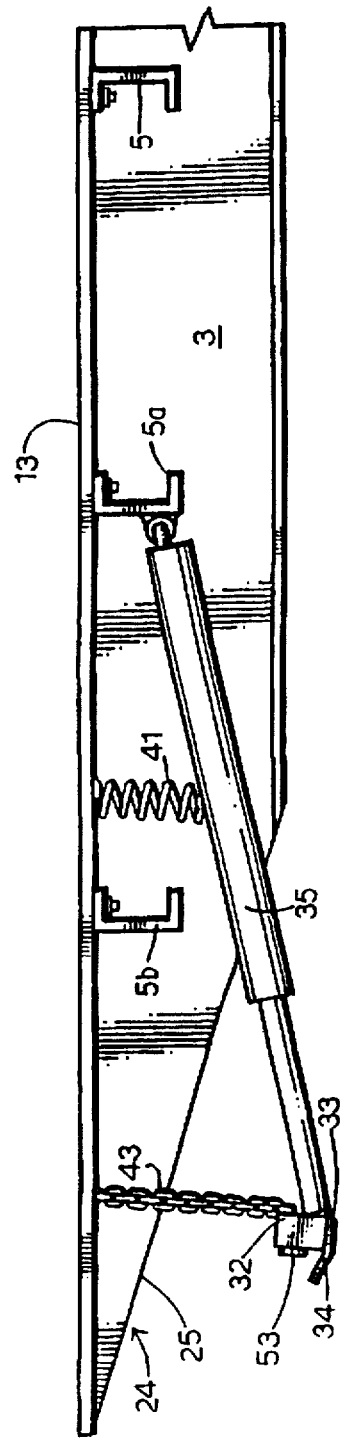
FIG. 5 is a greatly enlarged, fragmentary, cross sectional view of the trailer of FIG. 1, taken along line 5—5 of FIG. 6, and showing a portion of the trailer deck in the transport position and the tail light bar in a lowered position.

The trailer 1 also includes a pivoting tail light bar system 30, including a tail light bar, generally indicated at 31. The tail light bar 31 comprises an elongate rectangular box 32 which is positioned beneath and extends across most of the width of the trailer 1 beneath the rear end of the deck 13. The box 32 is oriented substantially vertically when in the transport position, as shown in FIGS. 4 and 5. A skid plate 33, which is oriented generally horizontally, is attached beneath the box 32 and includes a rear portion 34 which is angled slightly upward.

The box 32 is attached to and supported by one end of each of a pair of shock absorbing support arms 35 and 36. The opposite end of each support arm 35 and 36 is pivotably attached to a support beam 5a. A pair of coil springs 41 and 42 are respectively attached between the tops of the support arms 35 and 36 and an underneath side of the deck 13. A pair of chains 43 and 44 are attached between respective ends of the box 32 and the underneath side of the deck 13. A rearmost support beam 5b has a pair of cutouts 45 and 46 centered above respective ones of the support arms 35 and 36.

A pair of conventional tail lights 51 and 52 are positioned within opposite ends of the box 32, with each tail light 51 and 52 including a lens 53 extending rearward from the box 32. A plurality of running lights 54 can also be positioned in the box 32, preferably near the center thereof.

Figure 6:
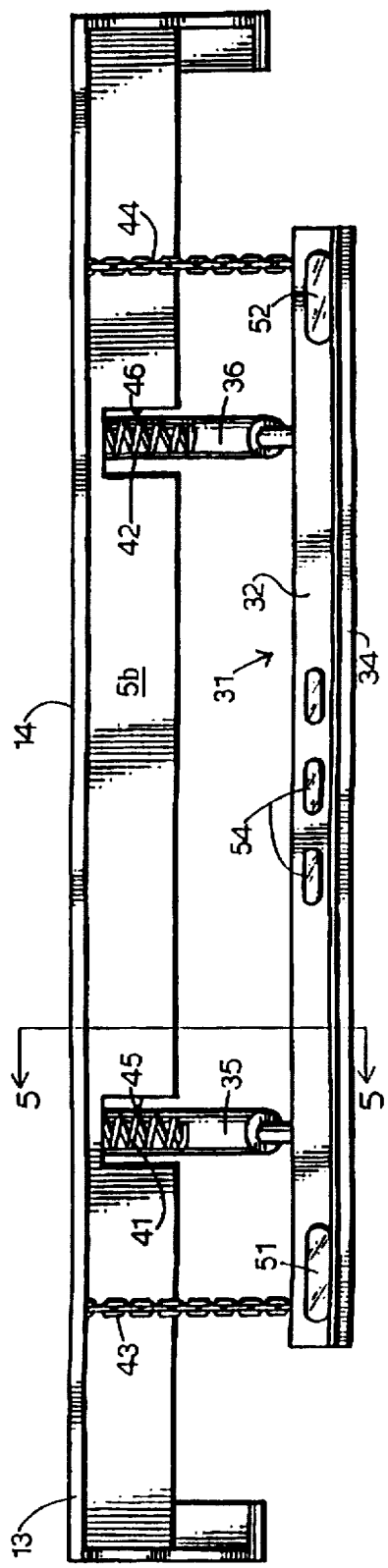
FIG. 6 is an enlarged, fragmentary, rear elevational view of the trailer of FIG. 1, showing the trailer deck in the transport position and the tail light bar in the lowered position.

When the trailer 1 is in the transport position, as shown in FIGS. 4–6, the tail light bar 31 drops down to a lowered position just below the lowermost portion of the side frame members 3 such that the tail lights 51 and 52 and the running lights 54 are clearly visible from behind the trailer 1. The chains 43 and 44 limit the extent to which the tail light bar 31 is lowered. As the jack 23 is extended, thus pivoting the rear of the deck 13 downward to contact the ground, as shown in FIGS. 1–3, the skid plate 33 hits the ground, thus causing the tail light bar 31 and the support arms 35 and 36 to pivot upward against the action of the springs 41 and 42 to the position shown in FIG. 3 where the bar 32 is positioned above the bevel angle 25 of the deck 13 and the side frame members 3. This allows the deck 13 to rest solidly on the ground without interference from the tail light bar 31. The cutouts 45 and 46 allow the support arms 35 and 36 to freely pivot upward to the extent required.

As the jack 23 is retracted, thus pivoting the deck 13 back to the horizontal transport position, the weight of the tail light bar 31 and the action of the springs 41 and 42 cause the tail light bar 31 to pivot back downward to the transport position of FIGS. 4–6. Again, the chains 43 and 44 limit the extent to which the tail light bar 31 can descend.

The support arms 35 and 36, as earlier mentioned, are designed to be shock absorbing, thus serving the additional function of allowing the tail light bar to absorb impacts to it in the event of a rear end collision between the trailer 1 and any stationary or moving object, such as a loading dock or another vehicle.

III. Pivoting Bumper System

Referring to FIGS. 7 and 8, an alternative pivoting bumper system is shown and generally indicated at 61. The bumper system 61 is attached to an alternative deck 62 of the trailer 1. The deck 62 is identical in all respects to the deck 13 except that a rear surface 63 of the deck 62 is squared off to present a flat surface for the positioning of a pair of tail lights 64 and running lights 65 therein. Parts of the bumper system 61 which are identical to that of the tail light bar system 30 have been numbered the same as in the system 30.

The bumper system 61 comprises an elongate rectangular bumper 71 which is positioned beneath and extends across most of the width of the trailer 1 beneath the rear end of the deck 62. The bumper 71 can be comprised of a hard rubber or plastic and includes a rear portion 72 which is angled upward to serve as a ramp for loading or unloading vehicles or the like.

Similar to the tail light bar 31 described above, the bumper 71 is attached to and supported by one end of each of a pair of shock absorbing support arms 35 and 36. The opposite end of each support arm 35 and 36 is pivotably attached to a support beam 5a. A pair of coil springs 41 and 42 are respectively attached between the tops of the support arms 35 and 36 and an underneath side of the deck 13. A pair of chains 43 and 44 are attached between respective ends of the bumper 71 and the underneath side of the deck 13. A rearmost support beam 5b has a pair of cutouts 45 and 46 centered above respective ones of the support arms 35 and 36.

When the trailer 1 is in the transport position, as shown in FIGS. 4–6, the bumper 71 drops down to a lowered position just below the lowermost portion of the side frame members 3 such that the tail lights 64 and the running lights 65 positioned on the deck rear surface 63 are clearly visible from behind the trailer 1. The chains 43 and 44 limit the extent to which the bumper 71 is lowered. As the jack 23 is extended, thus pivoting the rear of the deck 62 downward to contact the ground, as shown in FIG. 7, a bottom surface 73 of the bumper 71 hits the ground, thus causing the bumper 71 and the support arms 35 and 36 to pivot upward against the action of the springs 41 and 42 to the position shown in FIG. 7. This allows the bumper 71 to act as a ramp for loading the deck 62 as well as protecting the lights 64 and 65 from damage during loading/unloading operations. Again, the cutouts 45 and 46 allow the support arms 35 and 36 to freely pivot upward to the extent required.

As the jack 23 is retracted, thus pivoting the deck 13 back to the horizontal transport position, the weight of the bumper 71 and the action of the springs 41 and 42 cause the bumper 71 to pivot back downward to the transport position of FIGS. 4–6. Again, the chains 43 and 44 limit the extent to which the bumper 71 can descend.

Again, the support arms 35 and 36 are designed to be shock absorbing, thus serving the additional function of allowing the bumper 71 to absorb impacts to it in the event of a rear end collision between the trailer 1 and any stationary or moving object, such as a loading dock or another vehicle.

Although a ball-type trailer hitch 32 is shown, various other types of hitches could be successfully employed with the trailer of the present invention, including fifth-wheel, king pin and pintle types of hitches. While the trailer 1 has been shown with a deck 13 (or 62) and frame 2 which simply pivots about a stationary carriage 6, the inventive tail light bar system 30 or bumper system 61 can be used with any type of tilt bed trailer or truck, such as any of those taught in applicant's '691 application, which was earlier incorporated herein by reference. While the pivoting tail light bar system 30 and bumper system 61 have been shown with shock absorbing support arms 35 and 36, rigid support arms could be substituted therefor. Furthermore, while chains 43 and 44 have been illustrated as a tether to constrain the extend to which the tail light bar 31 can descend, other methods of constraint could be used as well, such as a fixed stop positioned beneath the support arms 35 and 36, a strap tether or a limiting mechanical stop associated with the pivotable connection of the support arms 35 and 36 to the trailer 1.

It is thus to be understood that while certain forms of the present invention have been illustrated and described herein, it is not to be limited to the specific forms or arrangement of parts described and shown.

What is claimed and desired to be secured by Letters Patent is as follows:

1. A pivoting bumper system for a movable-deck vehicle, said vehicle including a deck which is pivoting between a generally horizontal, transport position and a tilted, loading/unloading position, with one or more rear facing lights attached to a rear surface of said deck, said bumper system comprising:

a. an elongate bumper; and
   b. a pair of shock absorbing support arms, each support arm with one end attached to said bumper and with a second end pivotably attached to said vehicle beneath said deck so that said support arms and said bumper are pivotable between a lowered position when said deck is in said horizontal, transport position and a raised position when said deck is in said tilted, loading/unloading position, said bumper at least partially covering and protecting said rear facing lights when it is placed in said raised position.

2. A bumper system as in claim 1, and further comprising constraining means for constraining the extent to which said bumper can descend.

3. A pivoting bumper system as in claim 2, wherein said constraining means comprises a pair of chains connected between said bumper and said deck, said chains being of a length to hold said bumper at a preset height when it is placed in said lowered position.

4. A pivoting bumper system as in claim 1, wherein said bumper includes a tapered rear surface which allows it to be used as a ramp to said deck when it is placed in said raised position.

5. A pivoting bumper system for a movable-deck vehicle, said vehicle including a deck which is pivotable between a generally horizontal, transport position and a tilted, loading/unloading position, with one or more rear facing lights attached to a rear surface of said deck, said bumper system comprising:

a. an elongate bumper; and
   b. at least one support arm, said support arm with one end attached to said bumper and with a second end pivotably attached to said vehicle beneath said deck so that said support arm and said bumper are pivotable between a lowered position when said deck is in said horizontal, transport position and a raised position when said deck is in said tilted, loading/unloading position, said bumper at least partially covering and protecting said rear facing lights when it is placed in said raised position.

6. A bumper system as in claim 5, and further comprising a constraining mechanism which limits the angle to which said bumper and support arm can pivot downward to said lowered position.

7. A pivoting bumper system as in claim 6, wherein said constraining mechanism comprises at least one chain connected between said bumper and said deck, said chain being of a length to hold said bumper at a preset height when it is placed in said lowered position.

8. A pivoting bumper system as in claim 5, wherein said bumper includes a tapered rear surface which allows it to be used as a ramp to said deck when it is placed in said raised position.

9. A pivoting bumper system as in claim 5, wherein said support arm includes a resilient shock absorber.

* * * * *